DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 17, 1973

909 O.G. 797

T909,022

INTERIMAGE EFFECTS IN PHOTOGRAPHIC COLOR ELEMENTS

James Leo Graham, % Eastman Kodak Company, Kodak Park Division, 1669 Lake Ave., Rochester, N.Y. 14650

Filed Sept. 21, 1972, Ser. No. 290,934
Int. Cl. G03c *7/16*
U.S. Cl. 96—22
No Drawing. 18 Pages Specification

Processes for providing multicolor photographic reproductions wherein silver images are developed in exposed photographic elements having at least two superposed hydrophilic colloid layers containing silver halide, and forming differently colored dye images in proportion to the silver images. This invention provides an improvement in such processes whereby undercut interimage effects are obtained in at least one of the dye images. These undercut interimage effects are obtained by introducing a compound selected from the group consisting of 2,3-dimethylthiazolium salt, S-$\beta$-hydroxyethylthiourea, 1-(2-mercaptoethyl)-1,4,4-trimethyl piperazinium salt, 2-thiobarbituric acid and 6-$\beta$-carboxyethyl - 4 - hydroxy-2-mercaptopyrimidine.